(12) United States Patent  
Su

(10) Patent No.: US 9,398,197 B2  
(45) Date of Patent: Jul. 19, 2016

(54) APPARATUS AND METHOD FOR SYNCHRONIZING AUDIO-VIDEO

(71) Applicant: HON HAI PRECISION INDUSTRY CO., LTD., New Taipei (TW)

(72) Inventor: Chi-Chung Su, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/479,446

(22) Filed: Sep. 8, 2014

(65) Prior Publication Data

US 2015/0281524 A1   Oct. 1, 2015

(30) Foreign Application Priority Data

Mar. 25, 2014  (TW) .............................. 103111090 A

(51) Int. Cl.
| | |
|---|---|
| *H04N 7/15* | (2006.01) |
| *H04N 5/04* | (2006.01) |
| *H04N 7/14* | (2006.01) |
| *H04N 21/20* | (2011.01) |

(52) U.S. Cl.
CPC ................. *H04N 5/04* (2013.01); *H04N 7/147* (2013.01); *H04N 7/15* (2013.01); *H04N 21/20* (2013.01)

(58) Field of Classification Search
CPC ......... H04N 7/147; H04N 7/14; H04N 7/141; H04N 7/148; H04N 7/15; H04N 7/152; H04N 21/4307
USPC .............................. 348/14.01–14.16; 709/704
See application file for complete search history.

(56) References Cited

U.S. PATENT DOCUMENTS

| | | |
|---|---|---|
| 2008/0165245 A1 | 7/2008 | Sarkar et al. |
| 2012/0098923 A1 | 4/2012 | Westin |
| 2014/0118473 A1* | 5/2014 | Halavy .................. H04N 7/152 348/14.09 |

* cited by examiner

*Primary Examiner* — Melur Ramakrishnaiah

(74) *Attorney, Agent, or Firm* — ScienBiziP, P.C.

(57) ABSTRACT

An apparatus and method for synchronizing audio-video captures first audio data, and sends the first audio data to a communication device. The first audio data includes first audio timestamps. The apparatus captures first video data, and sends the first video data to the communication device. The apparatus adjusts the first audio timestamps to adjust the first audio timestamps after receiving a DTMF message.

11 Claims, 5 Drawing Sheets

APPARATUS AND METHOD FOR SYNCHRONIZING AUDIO-VIDEO

FIELD

Embodiments of the present disclosure relate to video conference systems, and more particularly to an apparatus and a method for synchronizing audio-video.

BACKGROUND

In a video conference system, when audio and video streams captured by a sender's endpoint are sent to a receiver's endpoint, the receiver's endpoint relies on timestamps of the audio and video streams to synchronize the audio stream to the video stream.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
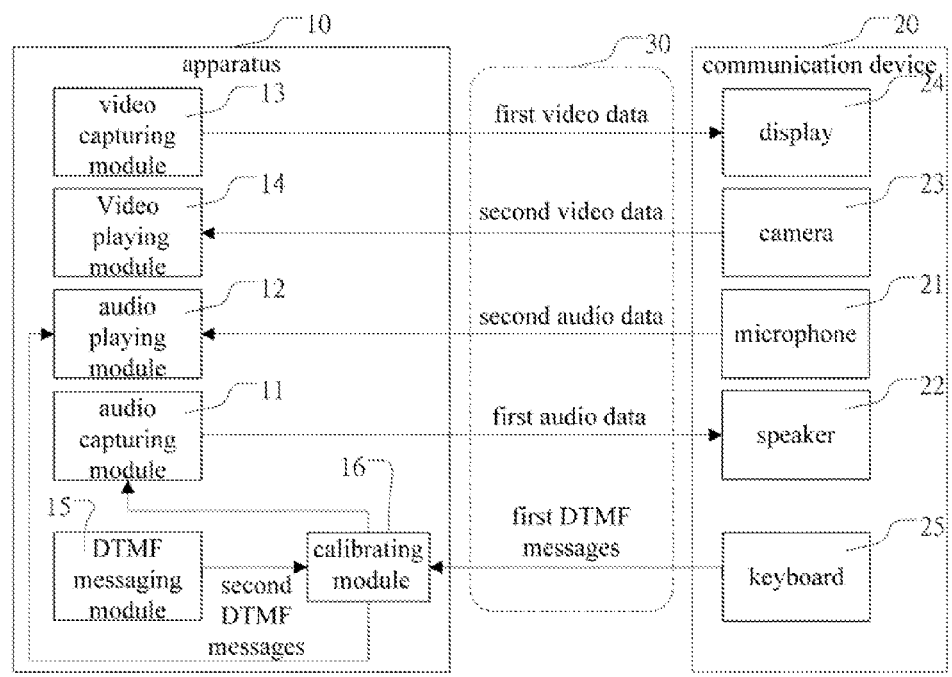
FIG. 1 illustrates a diagrammatic view of an embodiment of a video conference system of the present disclosure.

FIG. 1 illustrates a diagrammatic view of an embodiment of a video conference system of the present disclosure. The video conference system is a set of telecommunication technologies that can allow two or more terminals to intercommunicate by simultaneous two-way video and audio transmission. One telecommunication technology used in the video conference system is digital compression of audio and video streams in real time. In one embodiment of the present disclosure, the two terminals of the video conference system are an apparatus for synchronizing audio-video 10 (hereinafter "the apparatus 10") and a communication device 20. The apparatus 10 and the communication device 20 can intercommunicate by simultaneous two-way video and audio transmission through a network 30. The network 30 is a telecommunications network that allows the apparatus 10 and the communication device 20 to exchange data. In one embodiment, the network 30 is a wide area network (WAN). In other embodiments, the network 30 can be a local area network (LAN) or other type of network.

The apparatus 10 comprises an audio capturing module 11, an audio playing module 12, a video capturing module 13, a video playing module 14, a dual-tone multi-frequency (DTMF) messaging module 15, and a calibrating module 16.

The apparatus 10 further comprises a processor (not shown) and a storage system (not shown). The storage system stores one or more software programs in the form of computerized codes operable to be executed by the processor. The one or more software programs comprise instructions for the modules 11-16 of the apparatus 10. The audio capturing module 11 captures first audio data of the apparatus 10 and sends the first audio data to the communication device 20. The first audio data comprises first audio timestamps. The video capturing module 13 captures first video data of the apparatus 10 and sends the first video data to the communication device 20. The calibrating module 16 can adjust the first audio timestamps of the first audio data after receiving a first DTMF message from the communication device 20.

The communication device 20 comprises a microphone 21, a speaker 22, a camera 23, a display 24, and a keyboard 25. The speaker 22 is used for receiving the first audio data and playing a first audio corresponding to the first audio data. The display 24 is used for receiving the first video data and playing a first video corresponding to the first video data. The keyboard 25 is used for sending the first DTMF message to the calibrating module 16.

In one embodiment, the first DTMF message can include two or more DTMF digits. For example, the two DTMF digits can be 4 and 6. When the first DTMF message includes the DTMF digit 4, the calibrating module 16 increases the first audio timestamps by a first predetermined value, and when the first DTMF message includes the DTMF digit 6, the calibrating module 16 decreases the first audio timestamps by the first predetermined value. In other embodiments, the DTMF digits can be other digit numbers such as 3 and 5.

During a video conference, when the first audio is unsynchronized to the first video, the keyboard 25 of the communication device 20 can be operated to generate and send the first DTMF message to the calibrating module 16 of the apparatus 10 through the network 30. Thus, the first audio timestamps can be adjusted according to the corresponding DTMF digit to synchronize the first audio to the first video.

The microphone 21 of the communication device 20 is used for capturing second audio data of the communication device 20, and sending the second audio data to the audio playing module 12 of the apparatus 10 for synchronizing audio-video. The second audio data comprises second audio timestamps. The audio playing module 12 plays a second audio corresponding to the second audio data. The camera 23 of the communication device 20 is used for capturing second video data of the communication device 20 and sending the second video data to the video playing module 14 of the apparatus 10. The video playing module 14 plays a second video corresponding to the second video data. The calibrating module 16 can further adjust the second audio timestamps of the second audio data after receiving a second DTMF message sent from the DTMF messaging module 15 of the apparatus 10.

The DTMF messaging module 15 of the apparatus 10 is used for generating the second DTMF message, and the second DTMF message can include two or more DTMF digits. For example, the two DTMF digits can be 3 and 5. When the second DTMF message includes the DTMF digit 3, the calibrating module 16 increases the second audio timestamps by a second predetermined value, and when the first DTMF message includes the DTMF digit 5, the calibrating module 16 decreases the first audio timestamps by the second predetermined value. In other embodiments, the DTMF digits can be other digit numbers such as 4 and 6. In the embodiment, the first predetermined value and the second predetermined value can be the same or adjusted according to actual needs.

During a video conference, when the second audio is unsynchronized to the second video, the DTMF messaging module 15 can be operated to generate and send the second DTMF message to the calibrating module 16. Thus, the second audio timestamps can be adjusted according to the corresponding DTMF digit to synchronize the second audio to the second video.

Figure 2:
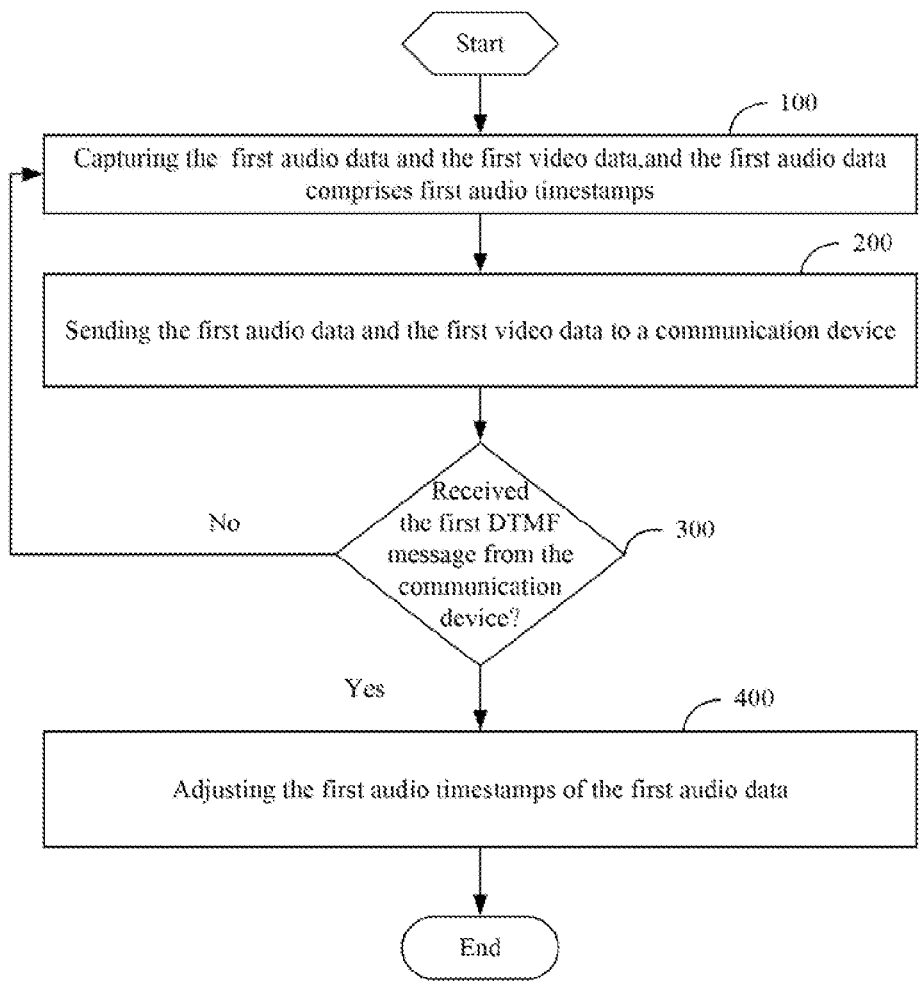
FIG. 2 illustrates a flowchart of an embodiment of a method for synchronizing audio-video of the video conference system of FIG. 1.

FIG. 2 illustrates a flowchart of an example method for synchronizing audio-video of the video conference system of FIG. 1. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is illustrative only, and the order of the blocks can change according to the present disclosure. Additional blocks can be added or fewer blocks can be utilized without departing from this disclosure. The example method can begin at block 100.

In block 100, an audio capturing module captures first audio data of an apparatus, and a video capturing module captures first video data of the apparatus. The first audio data comprises first audio timestamps.

In block 200, the audio capturing module sends the first audio data to a communication device, and the video capturing module sends the first video data to the communication device. The communication device receives the first audio data and the first video data to play a first audio and a first video.

In block 300, a calibrating module detects whether a first DTMF message is received from the communication device.

In block 400, the calibrating module adjusts first audio timestamps of the first audio data after receiving the first DTMF message from the communication device.

During a video conference, when the first audio is unsynchronized to the first video, a keyboard of the communication device can be operated to generate and send the first DTMF message to the calibrating module of the apparatus through a network. Thus, the first audio timestamps can be adjusted according to a corresponding DTMF digit of the first DTMF message to synchronize the first audio to the first video.

Figure 3:
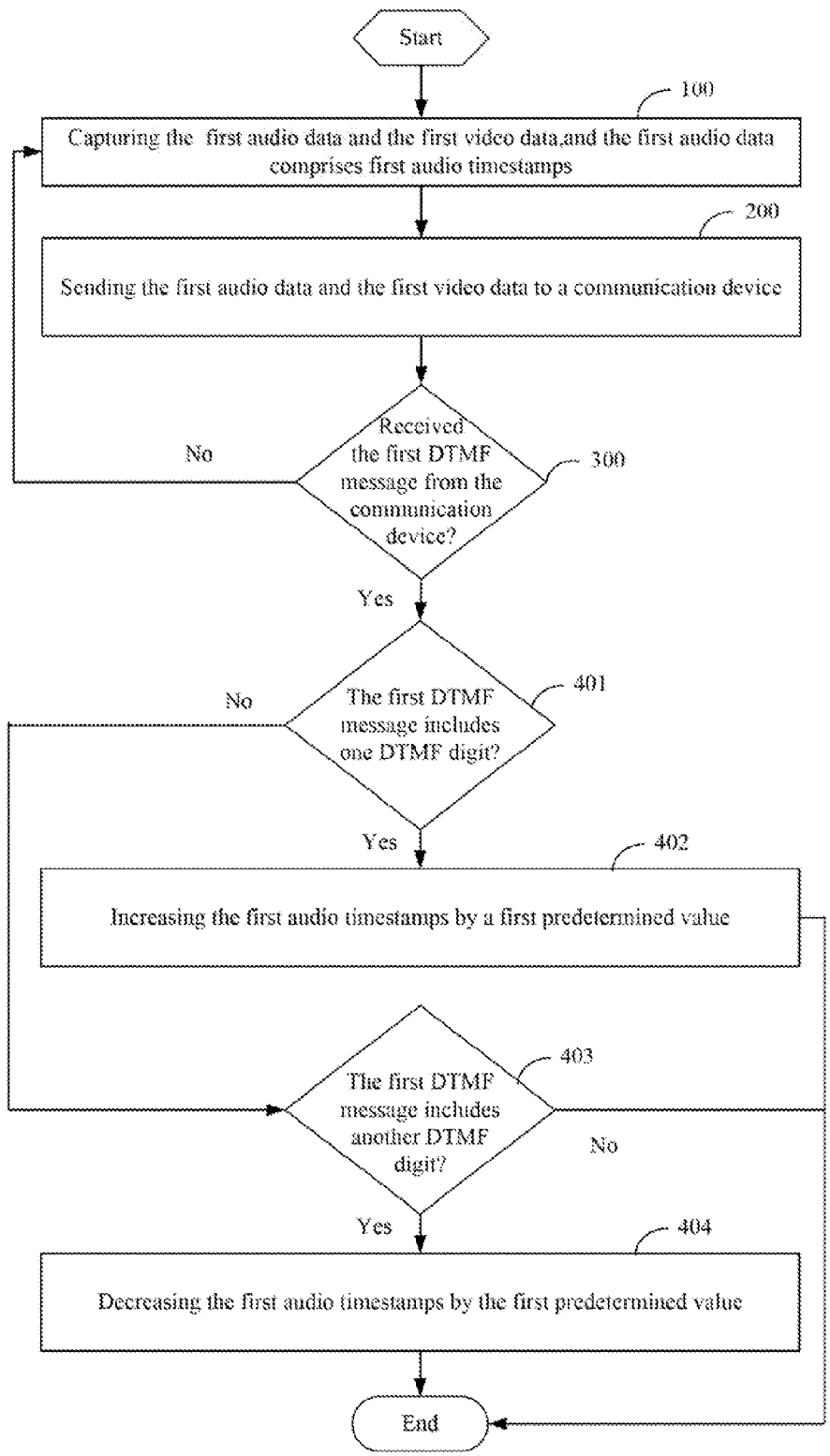
FIG. 3 illustrates a detailed flowchart of an embodiment of the method of FIG. 2.

FIG. 3 illustrates a detailed flowchart of the example of the method of FIG. 2. The example method is provided by way of example, as there are a variety of ways to carry out the method. The method described below can be carried out using the configurations illustrated in FIG. 1, for example, and various elements of these figures are referenced in explaining the example method. Each block shown in FIG. 3 represents one or more processes, methods, or subroutines carried out in the example method. Furthermore, the illustrated order of blocks is illustrative only, and the order of the blocks can change according to the present disclosure. Additional blocks can be added or fewer blocks can be utilized, without departing from this disclosure. The example method can begin at block 100.

In one embodiment, the first DTMF message can include two or more DTMF digits. For example, the two DTMF digits can be 4 and 6. When the first DTMF message includes the DTMF digit 4, the calibrating module increases the first audio timestamps by a first predetermined value, and when the first DTMF message includes the DTMF digit 6, the calibrating module decreases the first audio timestamps by the first predetermined value. In other embodiments, the DTMF digits can be other digit numbers such as 3 and 5.

In block 401, the calibrating module detects whether the first DTMF message includes the DTMF digit 4.

In block 402, the calibrating module increases the first audio timestamps by the first predetermined value when the first DTMF message includes the DTMF digit 4.

In block 403, the calibrating module detects whether the first DTMF message includes the DTMF digit 6 if the calibrating module detects that the first DTMF message dose not include the DTMF digit 4.

In block 404, the calibrating module decreases the first audio timestamps by the first predetermined value when includes the DTMF digit 6.

During a video conference, when the first audio is unsynchronized to the first video, a keyboard of the communication device can be operated to generate and send the first DTMF message to the calibrating module of the apparatus through a network. Thus, the first audio timestamps can be adjusted according to a corresponding DTMF digit of the first DTMF message to synchronize the first audio to the first video.

Figure 4:
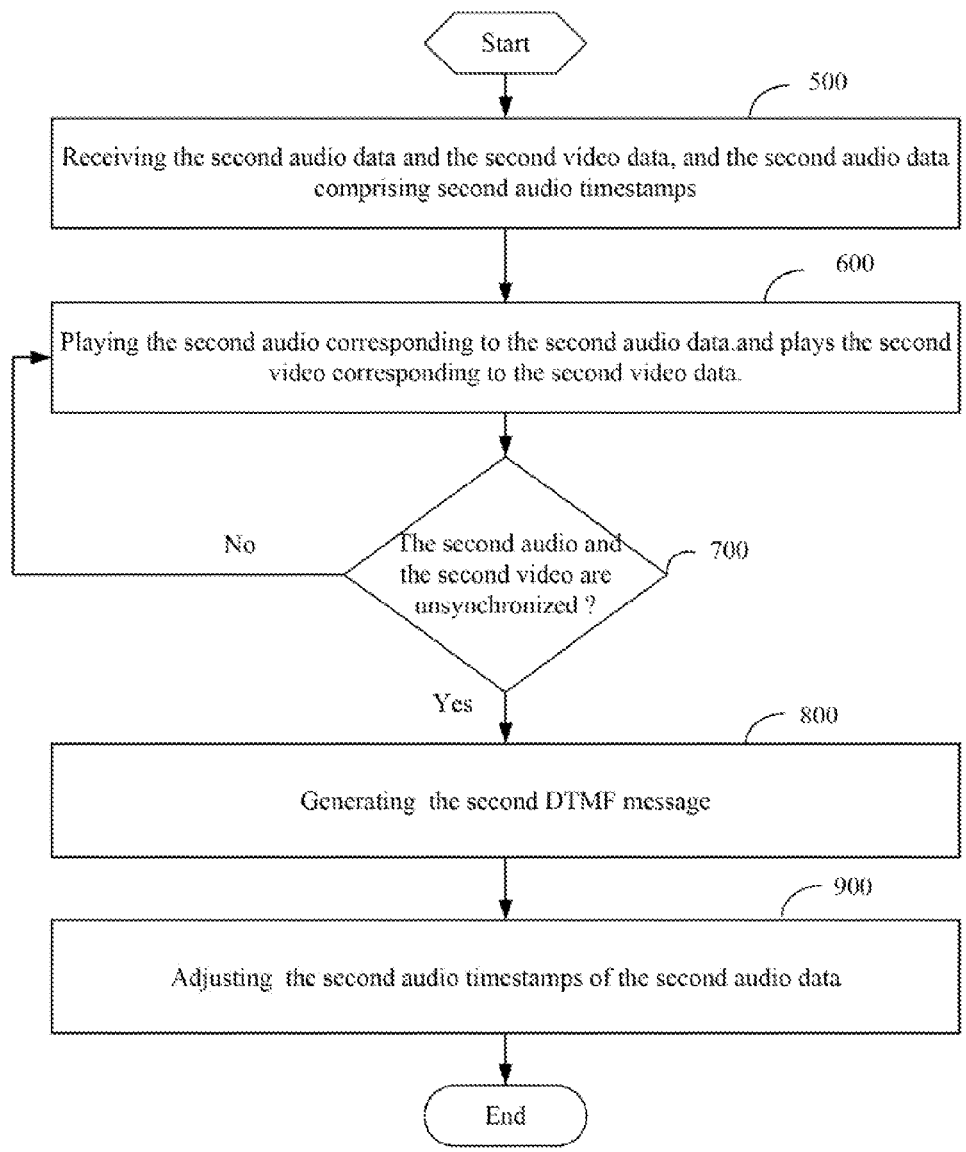
FIG. 4 illustrates a flowchart of another embodiment of a method for synchronizing audio-video of the video conference system of FIG. 1.

FIG. 4 illustrates a flowchart of another example method for synchronizing audio-video of the video conference system of FIG. 1. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represents one or more processes, methods, or subroutines carried out in the example method. Furthermore, the illustrated order of blocks is illustrative only, and the order of the blocks can change according to the present disclosure. Additional blocks can be added or fewer blocks can be utilized, without departing from this disclosure. The example method can begin at block 500.

In block 500, an audio playing module receives the second audio data. A video playing module receives the second video data. The second audio data comprises second audio timestamps.

In block 600, an audio playing module plays the second audio corresponding to the second audio data. A video playing module plays the second video corresponding to the second video data.

In blocks 700-800, a DTMF messaging module of the apparatus generates the second DTMF message when the second audio and the second video are unsynchronized. During a video conference, when the second audio is unsynchronized to the second video, the DTMF messaging module can be operated to generate and send the second DTMF message to the calibrating module.

In block 900, a calibrating module adjusts the second audio timestamps of the second audio data after receiving the second DTMF message from the DTMF messaging module. Thus, the second audio timestamps can be adjusted according to the corresponding DTMF digit of the second DTMF message to synchronize the second audio to the second video.

Figure 5:
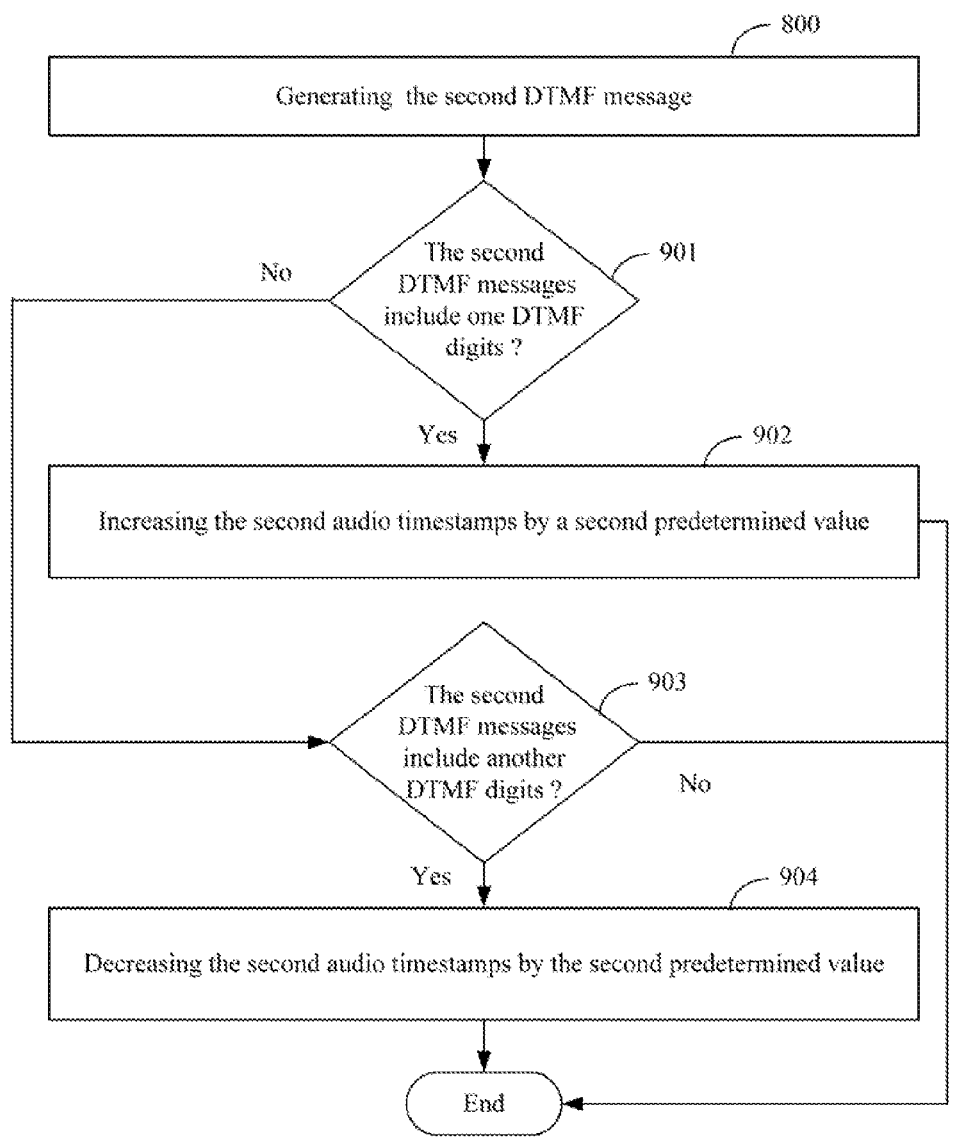
FIG. 5 illustrates a detailed flowchart of an embodiment of the method of FIG. 4.

FIG. 5 illustrates a detailed flowchart of the example of the method of FIG. 4. The example method is provided by way of example, as there are a variety of ways to carry out the method. The method described below can be carried out using the configurations illustrated in FIG. 1, for example, and various elements of these figures are referenced in explaining the example method. Each block shown in FIG. 3 represents one or more processes, methods, or subroutines carried out in the example method. Furthermore, the illustrated order of blocks is illustrative only, and the order of the blocks can change according to the present disclosure. Additional blocks can be added or fewer blocks can be utilized, without departing from this disclosure. The example method can begin at block 500.

In one embodiment, the second DTMF message can include two or more DTMF digits. For example, the two DTMF digits can be 3 and 5. When the second DTMF message includes the DTMF digit 3, the calibrating module increases the second audio timestamps by a second predetermined value, and when the first DTMF message includes the DTMF digit 5, the calibrating module decreases the first audio timestamps by the second predetermined value. In other embodiments, the DTMF digits can be other digit numbers such as 4 and 6. In the embodiment, the first predetermined value and the second predetermined value can be the same or adjusted according to actual needs.

In block 901, the calibrating module detects whether the second DTMF message includes the DTMF digit 4.

In block 902, the calibrating module increases the second audio timestamps by a second predetermined value when the second DTMF message includes the DTMF digit 4.

In block 903, the calibrating module detects whether the second DTMF message includes the DTMF digit 6 if the calibrating module 16 detects that the second DTMF message dose not include the DTMF digit 4.

In block 904, the calibrating module decreases the second audio timestamps by the second predetermined value when includes the DTMF digit 6.

During a video conference, when the second audio is unsynchronized to the second video, the DTMF messaging module can be operated to generate and send the second DTMF message to the calibrating module. Thus, the second audio timestamps can be adjusted according to the corresponding DTMF digit of the second DTMF message to synchronize the second audio to the second video.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An apparatus for synchronizing audio-video comprising:
    a processor; and
    a storage system storing one or more software programs in form of computerized codes operable to be executed by the processor, the one or more software programs comprising instructions for:
    capturing a first audio data and sending the first audio data to a communication device, wherein the first audio data comprises first audio timestamps;
    capturing a first video data and sending the first video data to the communication device; and
    adjusting the first audio timestamps of the first audio data after receiving a trigger;
    wherein the communication device receives the first audio data and the first video data to play a first audio and a first video corresponding to the first audio data and the first video data, and sends the trigger to the apparatus when the first audio and the first video are unsynchronized;
    wherein the trigger is a first dual-tone multi-frequency (DTMF) message generated by the communication device, and the first DTMF message includes two or more DTMF digits, wherein, adjusting the first audio timestamps of the first audio data after received a trigger, the one or more software programs comprising instructions for:
    increasing the first audio timestamps by a first predetermined value when the first DTMF message includes one DTMF digit; and
    decreasing the first audio timestamps by the first predetermined value when the first DTMF message includes another DTMF digit.

2. The apparatus of claim 1, wherein the one or more software programs further comprise instructions for:
    receiving a second audio data to play a second audio corresponding to the second audio data, and the second audio data comprising second audio timestamps;
    receiving a second video data to play a second video corresponding to the second video data; and
    adjusting the second audio timestamps of the second audio data when the second audio and the second video are unsynchronized.

3. The apparatus of claim 2, wherein, adjusting the second audio timestamps of the second audio data when the second audio and the second video are unsynchronized, the one or more software programs comprising instructions for:
    generating a second DTMF message when the second audio and the second video are unsynchronized, and the second DTMF message includes two or more DTMF digits;
    increasing the second audio timestamps by a second predetermined value when the second DTMF message includes one DTMF digit; and
    decreasing the second audio timestamps by the second predetermined value when the second DTMF message includes another DTMF digit.

4. A method for synchronizing audio-video, comprising:
    capturing a first audio data and sending the first audio data to a communication device, wherein the first audio data comprises first audio timestamps;
    capturing a first video data and sending the first video data to the communication device; and
    adjusting the first audio timestamps of the first audio data after receiving a trigger;
    wherein the communication device receives the first audio data and the first video data to play a first audio and a first video corresponding to the first audio data and the first video data, and sends out the trigger when the first audio and the first video are unsynchronized; and
    wherein the trigger is a first dual-tone multi-frequency (DTMF) message generated by the communication device, and the first DTMF message includes two or more DTMF digits, wherein adjusting the first audio timestamps of the first audio data after received a trigger comprising:
    increasing the first audio timestamps by a first predetermined value when the first DTMF message includes one DTMF digit; and
    decreasing the first audio timestamps by the first predetermined value when the first DTMF message includes another DTMF digit.

5. The method of claim 4, also comprising:
    receiving a second audio data to play a second audio corresponding to the second audio data, and the second audio data comprising second audio timestamps;
    receiving a second video data to play a second video corresponding to the second video data; and
    adjusting the second audio timestamps of the second audio data when the second audio and the second video are unsynchronized.

6. The method of claim 5, wherein, adjusting the second audio timestamps of the second audio data when the second audio and the second video are unsynchronized comprising:
   generating a second DTMF message when the second audio and the second video are unsynchronized, and the second DTMF message includes two or more DTMF digits;
   increasing the second audio timestamps by a second predetermined value when the second DTMF message includes one DTMF digit; and
   decreasing the second audio timestamps by the second predetermined value when the second DTMF message includes another DTMF digit.

7. A method for synchronizing audio and video comprising:
   capturing a first audio data at an apparatus, wherein the first audio data comprises first audio timestamps;
   sending the first audio data to a communication device;
   capturing a first video data at the apparatus;
   sending the first video data to the communication device;
   receiving a trigger at the apparatus from the communication device when the first audio and the first video data are unsynchronized; and
   adjusting the first audio timestamps of the first audio data after receiving the trigger, wherein the trigger is a first dual-tone multi-frequency (DTMF) message generated by the communication device.

8. The method of claim 7, wherein the first DTMF message includes two or more DTMF digits, wherein adjusting the first audio timestamps of the first audio data after received a trigger comprising:
   increasing the first audio timestamps by a first predetermined value when the first DTMF message includes one DTMF digit; and
   decreasing the first audio timestamps by the first predetermined value when the first DTMF message includes another DTMF digit.

9. The method of claim 8, also comprising:
   receiving a second audio data from the communication device, and wherein the second audio data comprising second audio timestamps;
   playing a second audio at the apparatus corresponding to the second audio data;
   receiving a second video data from the communication device;
   playing a second video corresponding to the second video data; and
   adjusting the second audio timestamps of the second audio data when the second audio and the second video are unsynchronized.

10. The method of claim 9, wherein, adjusting the second audio timestamps of the second audio data when the second audio and the second video are unsynchronized comprising:
   generating a second DTMF message when the second audio and the second video are unsynchronized, and the second DTMF message includes two or more DTMF digits;
   increasing the second audio timestamps by a second predetermined value when the second DTMF message includes one DTMF digit; and
   decreasing the second audio timestamps by the second predetermined value when the second DTMF message includes another DTMF digit.

11. The method of claim 10, wherein the DTMF message is generated through a input of a keyboard of the communication device.

* * * * *